(12) United States Patent     (10) Patent No.:     US 12,680,835 B2
Butscher et al.                   (45) Date of Patent:     Jul. 14, 2026

(54) METHOD FOR THE MEASUREMENT OF A POSITION OF A MAGNET BY MEANS OF A SENSOR ARRANGEMENT WITH AN INCREASED EXTERNAL MAGNETIC FIELD ROBUSTNESS, TAKING INTO ACCOUNT THE SIGNAL-TO-NOISE RATIO

(71) Applicant: elobau GmbH & Co. KG, Leutkirch (DE)

(72) Inventors: Roland Butscher, Isny (DE); Ulrich Gerhardt, Leutkirch (DE)

(73) Assignee: Elobau GmbH & Co. KG, Leutkirch (DE)

( * ) Notice: Subject to any disclaimer, the term of this patent is extended or adjusted under 35 U.S.C. 154(b) by 149 days.

(21) Appl. No.: 18/747,974

(22) Filed: Jun. 19, 2024

(65) Prior Publication Data

US 2024/0426635 A1     Dec. 26, 2024

(30) Foreign Application Priority Data

Jun. 21, 2023   (DE) ..................... 10 2023 116 302.7

(51) Int. Cl.
G01D 5/14          (2006.01)
(52) U.S. Cl.
CPC .................................... G01D 5/145 (2013.01)
(58) Field of Classification Search
CPC ....................................................... G01D 5/145
See application file for complete search history.

(56) References Cited

U.S. PATENT DOCUMENTS

| | | | | |
|---|---|---|---|---|
| 7,248,037 B2 * | 7/2007 | Hara | ....................... | G03B 17/02 |
| | | | | 324/207.2 |
| 8,026,715 B2 * | 9/2011 | Pozidis | ................... | B82Y 25/00 |
| | | | | 324/207.21 |
| 2017/0082459 A1 * | 3/2017 | Janisch | ................ | G01D 5/2448 |
| 2022/0001924 A1 * | 1/2022 | Pádár | ....................... | G01B 7/30 |

FOREIGN PATENT DOCUMENTS

| | | |
|---|---|---|
| DE | 19928557 A1 | 9/2000 |
| DE | 102020210617 A1 | 2/2022 |
| EP | 2616778 B1 | 8/2016 |
| EP | 1464918 B1 | 11/2016 |

* cited by examiner

*Primary Examiner* — Reena Aurora
(74) *Attorney, Agent, or Firm* — Notaro, Michalos & Zaccaria P.C.

(57)          ABSTRACT

An arrangement has a sensor pair and a magnet mounted to move relative thereto. Magnetic flux density per spatial coordinate per sensor is measured. A non-differential alteration of position of the magnet per the measured magnetic flux density is calculated. Differences of the measured magnetic flux densities per spatial coordinate are calculated. A differentially calculated alteration of position of the magnet from the calculated magnetic flux densities is calculated. Non-differentially and differentially calculated alterations of position of the magnet based on a null position thereof are normalised. Differences of the differentially calculated alteration of position of the magnet and the non-differentially calculated alterations of position thereof are calculated. A weighting factor based on the calculated differences is calculated. An average value, weighted by the calculated weighting factor, of the normalised non-differentially and differentially calculated alterations of position of the magnet is calculated to obtain an adjusted alteration of position.

12 Claims, 2 Drawing Sheets

3a, 3

3b, 3

1

METHOD FOR THE MEASUREMENT OF A POSITION OF A MAGNET BY MEANS OF A SENSOR ARRANGEMENT WITH AN INCREASED EXTERNAL MAGNETIC FIELD ROBUSTNESS, TAKING INTO ACCOUNT THE SIGNAL-TO-NOISE RATIO

CROSS-REFERENCE TO RELATED APPLICATIONS

This patent application claims the benefit of and priority to German Patent Application No. 10 2023 116 302.7, filed on Jun. 21, 2023, the disclosure of which is incorporated herein by reference in its entirety.

FIELD

The present invention relates to a method for measuring a position of a magnet by means of a sensor arrangement with an increased external magnetic field robustness, taking into account the signal-to-noise ratio.

BACKGROUND

In many different applications, it is necessary to determine the position of a operating element or a sensor in space, and thereby to determine its operating state. This allows numerous different operating positions to be set up without the need for any mechanical detent positions or similar. This also has the advantage that different feedback is passed on to a user, depending on the current position of the operating element, and the user can react accordingly.

This position is usually determined using an arrangement including a magnet, in particular a permanent magnet or an electromagnet, which is usually arranged on the operating element, and at least one sensor, which can determine the magnetic field broken down into the relevant spatial dimensions. The measured magnetic field is usually compared with the magnetic field of the magnet located on the operating element at least in a null position of the operating element, or with a measurement under laboratory conditions in order to determine the alteration of position of the magnet relative to a null position. This determination of the position of the magnet is prone to errors in two significant respects: On the one hand, the measurement is distorted by noise in the signal, which is inherently introduced the system by the components of the arrangement. On the other hand, the magnetic field of the magnet on the operating element can be overlaid by an extraneous field, as a result of which the results measured for the magnetic flux densities are also distorted, and may differ significantly from measurements taken under laboratory or ideal conditions, resulting in an incorrect determination of position.

For example, it is of known prior art to use more than one sensor, so that the measurements taken by one of the sensors can be verified by another sensor at a different position. It is also of known art to use the differences between the magnetic flux densities measured by the plurality of sensors to determine the position of the magnet, so that an extraneous field, which ideally acts equally on both sensors, is eliminated by forming the difference, and the calculated signal has a corresponding immunity to the extraneous field.

SUMMARY

Accordingly, a method for measuring the position of a magnet relative to a measurement location is of known prior art from EP 1 464 918 B1, in which the magnetic field is measured by two magnetic field sensors, and the position of the magnet in space is determined by forming a difference quotient from these measured magnetic fields. Although this method has the advantage that the determined position of the magnet is corrected for extraneous fields, the signals determined from the formation of difference quotients are significantly weakened, and any noise is significantly amplified relative to the signal.

In contrast, a signal measured in absolute terms, which is not offset against signals measured by other sensors by calculating the difference, is a particularly strong signal, in which noise s less significant by virtue of the component-related tolerances. However, this signal, measured in absolute terms and without offset, includes the extraneous field unchanged and in full, meaning that this signal may be heavily distorted, despite a good signal-to-noise ratio.

Consequently, the invention is based on the object of proposing a method for determining the position of a magnet, in which the determined result has both an extraneous field robustness and an advantageous signal-to-noise ratio.

This object is achieved by a method for signal processing from a magnet-sensor arrangement, wherein the magnet-sensor arrangement comprises at least one sensor pair and a magnet that is mounted such that it can move relative to the sensor pair, comprising the following steps:

a) Measurement of the magnetic flux density per spatial coordinate per sensor b) Non-differential calculation of an alteration of position of the magnet for each magnetic flux density measured in step a)

c) Calculation of the differences of the measured magnetic flux densities for each spatial coordinate d) Differential calculation of an alteration of position of the magnet from the magnetic flux densities calculated in step c)

e) Normalisation of the non-differentially, and differentially, calculated alterations of position of the magnet, on the basis of a null position of the magnet f) Calculation of the differences between the differentially calculated alteration of position of the magnet, and the non-differentially calculated alterations of position of the magnet g) Calculation of a weighting factor based on the differences calculated in step f)

h) Calculation of an average value, weighted by the weighting factor from step g), of the non-differentially, and differentially, calculated alterations of position of the magnet normalised in step e) in order to obtain a corrected alteration of position.

The magnet-sensor arrangement, on which the measurements in accordance with step a) of the method are based, consists of at least one pair of sensors and a magnet mounted such that it can move relative to the sensor pair. In the context of the invention, the term "magnet" means any device from which a magnetic field emanates, that is to say, in particular, permanent magnets or electromagnets. The movability of the magnet is above all a movability relative to the at least one sensor pair, such that an alteration of position of the magnet relative to a position of the sensor pair can be perceived and measured by the sensor pair. One sensor pair is advantageous for each direction along a spatial coordinate in which the magnet can be moved relative to the sensor pair, and the position of the magnet is to be determined. It is therefore only necessary to use one sensor pair for a linear movement in one direction or for a pivoting movement around a pivot axis. However, if a movement in one plane or about two pivoting axes is to be determined, one pair of sensors is required for each axis of movement, in this case, therefore, two pairs of sensors. Accordingly, each sensor pair is responsible for determining the alteration of position in an associated direction of movement. Here it is particularly advantageous for pivoting movements of the magnet if the sensors are Hall sensors, especially preferably 3D-Hall sensors, or other 3D-sensors, in order to map the pivoting movement of the magnet, and correspondingly the magnetic flux density emanating from it, in a Cartesian coordinate system. Alternatively, the use of sensors in the form of XMR-sensors, for example as TMR-, AMR- or GMR-sensors, is also in accordance with the invention.

In the first step a) of the method, the magnetic flux density is measured in the relevant spatial directions of a Cartesian coordinate system for each sensor, so that in the case of 3D-sensors, the magnetic flux densities are thereby measured in all three spatial directions of a Cartesian coordinate system for each sensor. Accordingly, in the example of 3D sensors, the magnetic flux densities are obtained in accordance with the principle $B_{xi}$, $B_{yi}$ and $B_{zi}$, where x, y and z represent the Cartesian coordinates and i is the index of the respective 3D-sensor. These measured magnetic flux densities are raw data that contain any extraneous field influences and also the position of the sensors relative to a null point of the magnet without distortion. From this raw data, a position or an alteration of position relative to a null position of the magnet is calculated for each sensor in step b). This results in a position, or alteration of position, that does not generally correspond to the actual value, due to the aforementioned external influences, and therefore does not have any extraneous field immunity. The invention defines a position, or an alteration of position, or a distance, as the position in which the magnet is located in space, wherein the null position of the magnet is defined as the origin, or null point, of a coordinate system in which the position is determined. Accordingly, the terms position, and alteration of position, are used interchangeably in the context of the present invention.

To calculate a position with extraneous field immunity, the differences in the magnetic flux densities are calculated, wherein the difference between the magnetic flux densities measured by the two sensors of a sensor pair is calculated for each relevant spatial direction. On the basis of the calculation of the difference between two magnetic flux densities influenced by the same extraneous field, this extraneous field is removed from the result, if the sensors are sufficiently close to each other such that the extraneous field appears almost homogeneous in the region of the sensors, or the extraneous field is almost homogeneous, such that the result of the calculation is a magnetic flux density corrected for the extraneous field. As is already the case in step b), a position of the magnet is determined from these magnetic flux densities corrected for the extraneous field. Although these differences in the magnetic flux densities, and the position of the magnet calculated from them, have an extraneous field immunity, the differences in the measured magnetic flux densities are significantly more susceptible to signal noise, by virtue of the technical tolerances of the sensors, so that the precision of the measurements and the positions calculated from them is reduced compared to the values from steps a) and b) of the method. The differences cited, which are calculated in steps c) and d), are the differences between the measured values of a sensor pair. If the method is executed for a plurality of sensor pairs, for example because the position of the magnet is to be determined in a plurality of spatial directions, the differences of steps c) and d) are calculated per spatial direction, and per sensor pair correspondingly assigned to the spatial direction.

Thus, in steps c) and d), the data are indeed largely corrected for the extraneous field, but these data are still distorted due to the offset position of the sensors relative to a null point of the magnet, and do not reflect the actual position of the magnet in space. The positions calculated in steps b) and d) are therefore normalised in step e) on the basis of the position of the sensors relative to the null position of the magnet, wherein in accordance with the invention the normalisation comprises a scaling and/or an offset correction.

This takes place particularly advantageously with respect to a point equidistant between the two sensors of the relevant sensor pair, which in particular is arranged directly below a null position of the magnet. This allows the magnetic flux densities measured by the two sensors to be compared, and a correspondingly simpler calculation of the position of the magnet to be performed.

In the next step f), the differences between the positions that were obtained from the different calculation methods in steps b) and d), and were then normalised in step e), are calculated. These results can also be used to draw conclusions about the extraneous field, which is still present in the position obtained from step b), but has already been eliminated in the position obtained from step d). The difference between the positions is calculated in step f) for each sensor, wherein the positions calculated in step b) are in each case subtracted from the position differentially calculated in step d).

These differences in the positions from the different calculation methods must be taken into account when calculating the weighting factor in step g), which in particular assumes a value between 0 and 1. On the basis of the size of the difference, a correspondingly large effect of the extraneous field on the measurement result from the sensors can be determined. It is therefore advantageous if as few extraneous field influences as possible are included in the calculation for the position determination, but at the same time the signal-to-noise ratio of the calculation factors is as good as possible. Accordingly, the stronger the extraneous field, the greater is the role of the weighting factor.

This weighting factor is used to form a weighted average of the normalised non-differentially calculated alterations of position from step b), and differentially calculated alterations of position from step d), in order to obtain a position of the magnet that is influenced as little as possible by both an extraneous field and also a degraded signal-to-noise ratio.

In a development of the invention, it is proposed that the movable magnet is pivotably mounted about at least one pivot axis, and that the alteration of position is measured in the form of a deflection angle. The method is thus used in a system with a pivoting lever, on which a magnet is arranged. This is regularly necessary for control levers or the like, where certain functions have to be carried out, or certain feedback has to be given to the user, based on the position of the lever.

In one configuration of the invention, it is proposed that the deflection angle is calculated from the measured magnetic flux densities using a trigonometric function. By virtue of the pivoting movement of a lever on which the magnet is arranged, the magnet can move on a circular path. This circular path of the magnet makes it possible to calculate the deflection angle using trigonometric functions, since the measured magnetic flux density of the magnet in a pivoting movement essentially shows the profile of a sine or cosine curve, depending on the deflection angle. Since this curve is, as expected, shifted to a deflection angle of 0°, due to the position of the sensors relative to a null position of the magnet, the deflection angles calculated from the trigonometric function must be normalised accordingly in a step e) of the method.

In a development of the invention, it is proposed that the differentially calculated deflection angle is calculated using a trigonometric function from the differences of the measured magnetic flux densities. As with the non-differential calculation of the deflection angle, the calculation is made possible here using a trigonometric function based on the pivoting movement of the magnet.

The use of an arc sine or arc cosine function is conceivable in both the differential and non-differential calculation of the deflection angle, but care must be taken during the calculation to ensure that the result is a unique angle. This is particularly uncertain if the calculated angles approach the ±90° limit, which by virtue of the displacement of the sensors to a null point, is already possible with significantly smaller actual deflection angles of the magnet. It is therefore advantageous if an arctangent function, in particular an arctangent2 function, is used for this purpose, which outputs a unique result. Here it makes sense, if possible, to calculate either the differentially or the non-differentially calculated deflection angle using a sine or cosine function, and the other deflection angle using the arctangent2 function, as the profile of the differentially and non-differentially calculated magnetic flux densities as a function of the deflection angle essentially, but not exactly, corresponds to a sine or cosine curve. This means that the calculation methods can be diversified and any deviations from an ideal sine or cosine curve can be compensated for in the processing of these calculated deflection angles by means of a multi-point adjustment or linearisation.

In one configuration of the invention, it is proposed that the weighted average value is formed in each case from one of the non-differentially calculated alterations of position and the differentially calculated alteration of position, wherein the total calculated alteration of position is calculated using the average value of the weighted average values. In particular, the sums of the weighted normalised differentially calculated position and weighted normalised non-differentially calculated positions are formed and offset against each other to produce an overall result. The result of the weighting is that, in the case of a strong extraneous field and a corresponding weighting factor, the differentially calculated position from step d) that is immune to the extraneous field is weighted more heavily than the non-differentially calculated position that is susceptible to the extraneous field, so that the extraneous field is largely eliminated and the poorer signal-to-noise ratio is accepted. However, if the extraneous field is weak or not present at all, the differentially calculated position that is immune to the extraneous field is weighted correspondingly less than the non-differentially calculated position, so that the signal-to-noise ratio is improved.

In a development of the invention, it is proposed that the normalisation in accordance with step e) is carried out by means of a multi-point adjustment, in particular a 9-point adjustment, or a 15-point adjustment. In the context of the invention a multi-point adjustment means a fixing of the position at a plurality of points, so that the position calculated in step b) or d) is equated with the expected positions at a plurality of points, for example at nine points in the case of a 9-point adjustment. The remaining values, which are not equated with the points, are normalised on the basis of a deviation of the ideal value from the calculated value, as in step e) in accordance with the invention. As a result, the normalisation is much finer overall than a simple normalisation, and enables the position of the magnet to be determined much more precisely.

In one configuration of the invention, it is proposed that an external magnetic field influencing the measurements is determined by the difference between the two differently calculated alterations of position, wherein these alterations of position are corrected by means of the multi-point adjustment. As already explained above, the extraneous field is determined in accordance with the invention by the deviations of the results obtained from the different calculation methods. In the context of the invention the supplementation of this determination of the extraneous field by the multi-point adjustment means an application of the multi-point adjustment to the results obtained from the different calculation methods. The data obtained by applying the multi-point adjustment correspond almost exactly to the actual position of the magnet, so that a deviation of the position calculated from the measured values from this data allows conclusions to be drawn about distortions of the expected position, which arise, at least predominantly, as a result of an extraneous field. In particular, the influences of potential non-linearities, slope or offset errors of the different calculation methods for the alteration of position are minimised by the multi-point adjustment. Accordingly, these deviations of the positions, which must be converted back into a magnetic flux density, correspond to the extraneous field.

In a development of the invention, it is proposed that an external magnetic field influencing the measurements is determined from the difference between the two differently calculated alterations of position, wherein these alterations of position are corrected by a comparison with a measurement taken under laboratory conditions. The same applies as for the correction by multi-point adjustment, wherein here the calculated results are also corrected for a mathematical error. Such an error has already been described above in the case of a pivoting movement of the magnet, in which the measured magnetic flux density, essentially, but not exactly, corresponds to a sine or cosine curve as a function of the deflection angle, and therefore the use of an arc sine or arc cosine function to calculate the deflection angle has a mathematical error, albeit a small one.

In one configuration of the invention, it is proposed that when calculating the weighting factor, a predefinable constant $A_{max}$ is taken into account, which describes the degree of deviation between differentially and non-differentially calculated alterations of position, from which the signal is used exclusively from the differentially calculated alteration of position in accordance with step d) for the calculation of the alteration of position. This constant can be predefined so that it can be changed for different applications, especially depending on the robustness of an extraneous field, but does not change dynamically based on any measurement results. The limits between a noisy signal, and a signal that is more independent of an extraneous field, can be harmonised by selecting a suitable constant. It is therefore advantageous if the constant is selected for a strong extraneous field such that the weighting factor is correspondingly in favour of the differentially calculated position that is immune to the extraneous field, and the non-differentially calculated position is weighted correspondingly low. This can be achieved in particular by the following mathematical dependency:

$$W_i \sim \frac{|\Delta\alpha_i|}{A_{max}}$$

7

8 where W stands for the weighting factor, the index i stands for one of the sensors, and $\Delta\alpha$ stands for the difference calculated in step f).

In a development of the invention, it is proposed that a predefinable constant $O_{diff}$ is taken into account when calculating the weighting factor, which can be used to specify what percentage of the differentially calculated signal is to be used to calculate the alteration of position. In the context of the invention the constant $O_{diff}$ means, in particular, an offset which is added to or subtracted from the normalised or scaled difference from step f). If, for example, weaker extraneous magnetic fields are present that lead to small changes in the measured values that are within a permissible tolerance, this constant can be used to suppress excessive weighting of the differentially calculated position so that the non-differentially calculated position can continue to be used with a good signal-to-noise ratio. This is particularly advantageous if the noise in the differentially calculated signal would be greater than an extraneous field influence on the low-noise, non-differentially calculated, signal. This constant can be predefined in the same way as the constant $A_{max}$ described above and can be customised for different applications if required.

In exemplary forms of embodiment of the invention, which are particularly advantageous for relative pivoting movements between the sensor pair and the magnet, the following formulae can be used for the calculations provided in steps b), d), e), f), g) and h), wherein the respective formulae are applicable independently of one another in different forms of embodiment, or together in a single form of embodiment.

Step b) provides for the non-differential calculation of the alteration of position. This can be done using simple trigonometric formulae in accordance with the following principle:

$$\alpha_i = \sin^{-1}\left(\frac{B_{x,i}}{|B_i|}\right)$$

where $\alpha$ stands for the calculated alteration of position, the index i stands for one of the sensors and $B_x$ stands for the measured magnetic flux density in the x-direction, that is to say, along the pivoting direction.

Step d) provides for the differential calculation of the alteration of position. This can also be carried out using simple trigonometric formulae in accordance with the following principle:

$$d\alpha = a\tan2(-dB_x, dB_z)$$

where $d\alpha$ stands for the calculated alteration of position, $dB_x$ for the differential magnetic flux density calculated in step c) in the x-direction, that is to say, along the pivoting direction, and $dB_z$ for the differential magnetic flux density calculated in step c) in the z-direction, that is to say, in the null position of the system radial to the pivoting movement.

Step e) provides for the normalisation of the non-differentially, and differentially, calculated alteration of position. This can preferably be carried out with the aid of a simple calibration using the two maximum deflections, or with the aid of a multi-point calibration, for example using one of the following formulae.

In accordance with the invention, the following formulae are advantageous for multi-point calibration:

$$\alpha_{i,norm} = \left[(\alpha_i - \alpha_{i,calc,1}) * \left(\frac{(\alpha_{i,set,2} - \alpha_{i,set,1})}{(\alpha_{i,calc,2} - \alpha_{i,calc,1})}\right)\right] + \alpha_{i,set,1}$$

for the non-differential calculation, and $$d\alpha_{i,norm} = \left[(d\alpha_i - d\alpha_{i,calc,1}) * \left(\frac{(d\alpha_{i,set,2} - d\alpha_{i,set,1})}{(\alpha_{i,calc,2} - \alpha_{i,calc,1})}\right)\right] + \alpha_{i,set,1}$$

for the differential calculation, where $\alpha_{i,\,norm}$ or $d\alpha_{i\,norm}$ stands for the calculated alteration of position, the index i stands for one of the sensors, the index 1 stands for a first calibration point and the index 2 stands for a second calibration point of the multi-point calibration, $\alpha_{i,\,calc}$ or $d\alpha_{i\,calc}$ stand for the calculated position at a calibration point, that is to say, along the pivoting direction, and $\alpha_{i,\,set}$ or $d\alpha_{i,\,set}$ stand for the angle of a calibration point.

Step f) provides for the calculation of the differences between the differentially calculated alteration of position and the non-differentially calculated alterations of position. In the context of the invention this is understood to mean a calculation in accordance with the following formula:

$$\Delta\alpha_i = d\alpha - \alpha_i$$

Step g) uses the differences calculated in step f) to calculate a weighting factor for weighting the measured values depending on the effect of the extraneous field on the measurement result, so that the differentially calculated, extraneous field-immune position is weighted more heavily if the extraneous field influence is stronger. In accordance with the invention, the use of the following formula is particularly advantageous for calculating a weighting factor:

$$W_i = \frac{|\Delta\alpha_i|}{A_{max}} + O_{diff}$$

where if $W_i < 0$, then $W_i = 0$ and if $W_i > 1$, then $W_i = 1$ where W stands for the weighting factor, the index i stands for one of the sensors, $\Delta\alpha_i$ for the difference calculated in step f). The predefined constants $A_{max}$ and $O_{diff}$ are freely selectable by a user, and allow the user to take the extraneous field influence into account in the calculation at their own discretion.

Step h) provides for the calculation of an adjusted alteration of position with the aid of the weighted average value from step g). In accordance with the invention, this is done particularly advantageously using the following formula:

$$P_i = W_i * d\alpha_{norm} - (1 - W_i) * \alpha_{i,norm}$$

and its subsequent averaging:

$$P = \frac{P_1 + P_2}{2}$$

where $P_i$ stands for the weighted alteration of position determined at sensor i and P stands for the weighted average of the alterations of position.

BRIEF DESCRIPTION OF THE DRAWINGS

The invention is explained in more detail below with reference to figures in a drawing. Identical parts are labelled with the same reference symbol.

DETAILED DESCRIPTION

Figure 1:
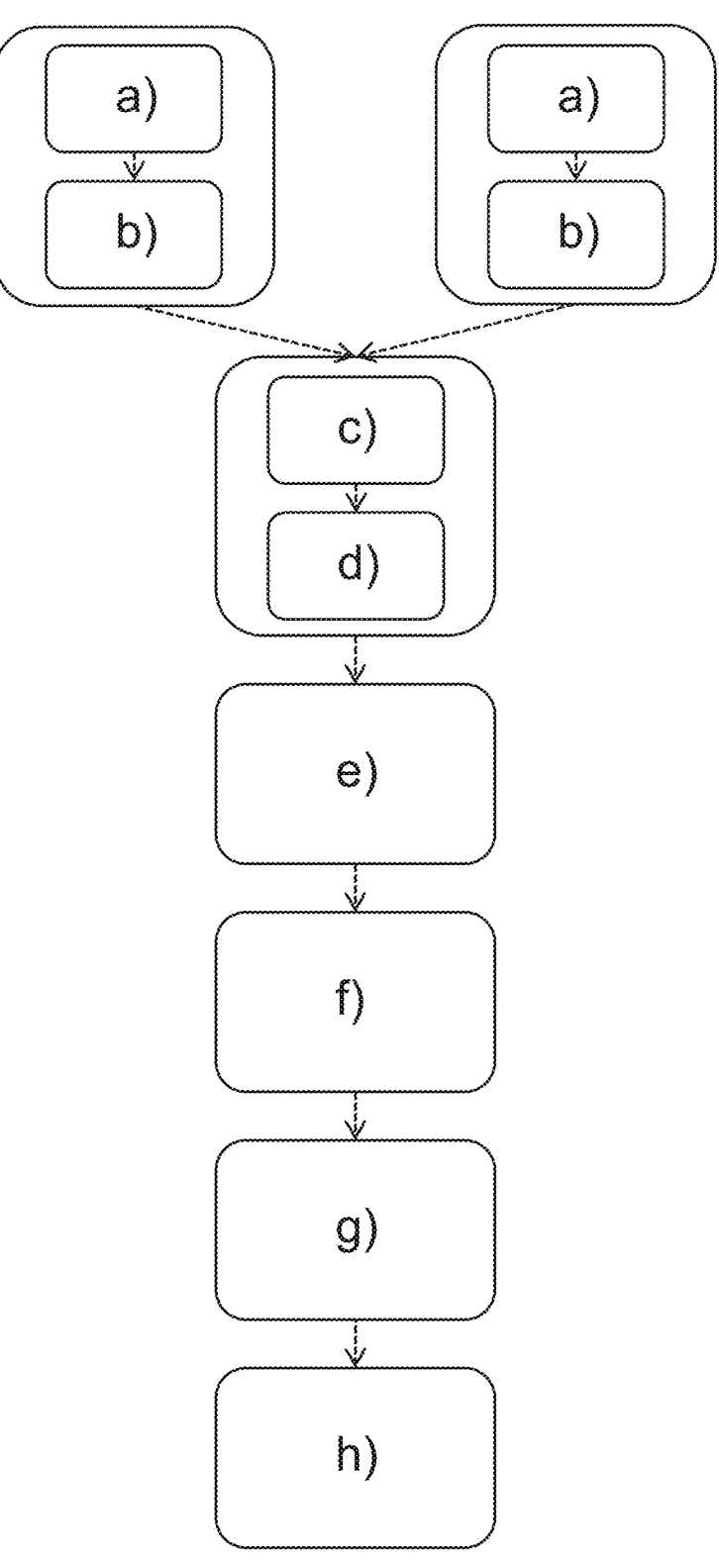
FIG. 1: Schematic diagram of the method

FIG. 1 shows the schematic diagram of the method in accordance with the invention. The schematic diagram shown relates to a method in accordance with the invention in which the signals from a magnet 2 are measured and processed by two sensors 3a, 3b, that is to say, a sensor pair 3. The first two steps a) and b) of the method are carried out for each sensor 3a, 3b. In the first step a), the magnetic flux density emanating from magnet 2 is recorded for each spatial coordinate. However, the number of spatial coordinates depends on the mobility of the magnet 2 relative to the sensors 3a, 3b, so that the magnetic flux density does not necessarily have to be determined in all three spatial coordinates. Furthermore, in step b) of the method, a non-differentially calculated alteration of position of the alteration of position of the magnet 2 is calculated for each magnetic flux density measured in step a). Here the term "non-differential" refers to the calculation of the alteration of position from the absolute values of the measured magnetic flux density. In accordance with the invention, the distance of the alteration of position is a distance or position, wherein these designations are further used interchangeably in what follows, relative to a null position of the magnet 2. The following steps c) and d) essentially correspond to the steps a) and b) of the method, wherein these are only executed once, and in particular not per sensor. Thus in step c), the differences between the magnetic flux densities measured in step a) are calculated for each spatial coordinate. In contrast to the absolute values from step a), the result is therefore a differentially calculated magnetic flux density, which is used in step d), in an analogous manner to step b), to differentially calculate an alteration of position of the magnet 2. In the subsequent step e) of the method, both the non-differentially calculated, and the differentially calculated, positions of magnet 2 from steps b) and d) of the method are normalised on the basis of a null position of magnet 2. This normalisation is necessary because the magnetic flux densities measured in step a) have been determined by sensors 3a, 3b, which are located at positions that are at a distance from a null position of the magnet 2, but the position of the magnet 2 is to be determined relative to this null position. Accordingly, this error is included in the magnetic flux densities calculated from the measured magnetic flux densities in step c), and in the positions of the magnet 2 calculated from them in steps b) and d), so that these values must also be normalised. The differences between the differentially calculated position and the non-differentially calculated positions of magnet 2 are then calculated in step f). This results in a difference between each non-differentially calculated position and the differentially calculated position of magnet 2. These differences allow conclusions to be drawn about an extraneous field, as the non-differentially calculated position contains the influence of the extraneous field, while the differentially calculated position is immune to the extraneous field. In addition, these differences must be taken into account in the further process step g), in which a weighting factor is calculated from these differences. By virtue of the size of the difference, a correspondingly large effect of the extraneous field on the measurement result of the sensors can be determined, and the weighting factor is correspondingly such that the differentially calculated, extraneous field-immune position is weighted more heavily. In the last step h) of the method, an average value of the non-differentially and differentially calculated positions of the magnet 2 normalised in step e), weighted by the weighting factor from step f), is calculated in order to obtain an adjusted alteration of position of the magnet 2. The weighting is selected on the basis of the calculations in step g) such that a compromise is found between the positions in which the influences of an unfavourable signal-to-noise ratio and a strong extraneous field are suppressed as favourably as possible.

Figure 2:
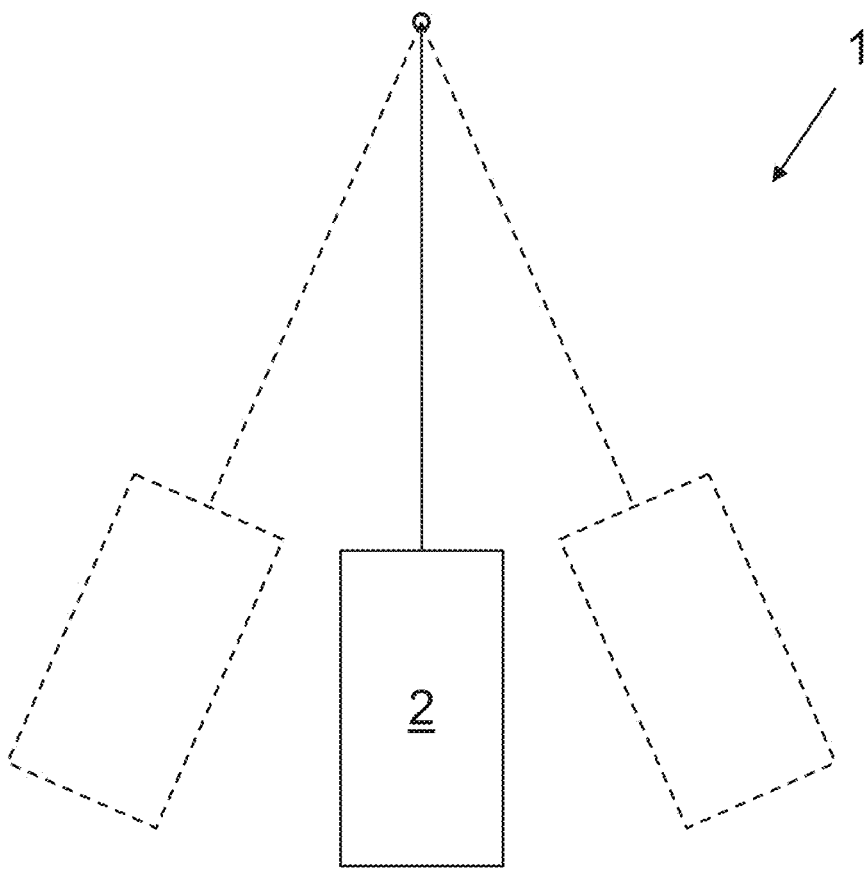
FIG. 2: Magnet-sensor arrangement in a preferred form of embodiment
Figure 2:
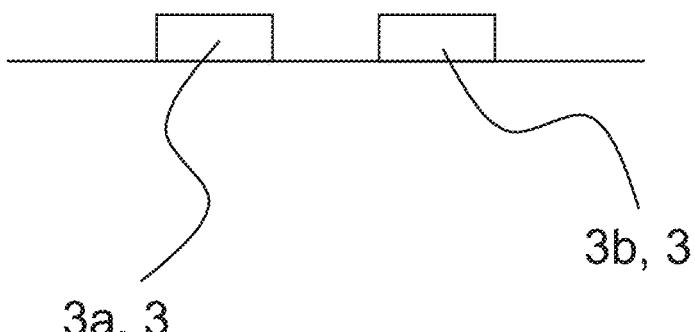

FIG. 2 shows a magnet-sensor arrangement 1 in a preferred form of embodiment to which the inventive method is applied. The magnet-sensor arrangement 1 is formed by a magnet 2 and a sensor pair 3, consisting of two sensors 3a and 3b spaced apart from each other. The magnet is mounted such that it can move relative to the sensors 3a, 3b. In this case, the magnet 2 is pivoted about a pivot axis, wherein the two sensors 3a, 3b are positioned relative to each other such that their equidistance point is located below a null position of the magnet 2. Here the sensor pair 3 detects the magnetic flux density emanating from the magnet 2 and is arranged in the direction of movement of the magnet 2 for further utilisation of the measured data in the method, so that in this case the magnet 2 can be positioned above both sensors in a fully-fledged movement.

LIST OF REFERENCE SYMBOLS

1. Magnet-sensor arrangement
2. Magnet
3. Sensor pair
3a First sensor
3b Second sensor

What is claimed is:

1. A method for processing sensor signals to determine a physical position of a magnet based on signals from a magnet-sensor arrangement (1), wherein the magnet-sensor arrangement (1) comprises at least one sensor pair (3) and a magnet (2) mounted such that it can move relative to the latter, comprising the following steps:

a) measurement, by the at least one sensor pair (3), of the magnetic flux density per spatial coordinate per sensor;

b) non-differential calculation of an alteration of position of the magnet (2) for each magnetic flux density measured in step a);

c) calculation of the differences of the measured magnetic flux densities per spatial coordinate;

d) differential calculation of an alteration of position of the magnet (2) from the magnetic flux densities calculated in step c);

e) normalisation of the non-differentially and differentially calculated alteration of position of the magnet (2) on the basis of a null position of the magnet (2);

f) calculation of the differences between the differentially calculated alteration of position of the magnet (2) and the non-differentially calculated alterations of position of the magnet (2) indicative of deviations caused by external magnetic field influences;

g) calculation of a weighting factor based on the differences calculated in step f) to adaptively combine the non-differentially and differentially calculated alterations of position; and h) calculation of an average value, weighted by the weighting factor from step g), of the non-differentially and differentially calculated alterations of position of the magnet (2) normalised in step e) to obtain a corrected alteration of position of the magnet relative to the magnet-sensor arrangement as a physical position of the magnet that compensates for external magnetic field influences while maintaining signal-to-noise ratio.

2. The method of claim 1, wherein the movable magnet (2) is pivotably mounted about at least one pivot axis and the alteration of position is measured in the form of a deflection angle.

3. The method of claim 2, wherein the deflection angle is calculated using a trigonometric function from the measured magnetic flux densities.

4. The method of claim 2, wherein the differentially calculated deflection angle is calculated using a trigonometric function from the differences of the measured magnetic flux densities.

5. The method of claim 1, wherein the weighted average value is formed from one of the non-differentially calculated alterations of position and the differentially calculated alteration of position, and wherein the total calculated alteration of position is calculated using the average value of the weighted average values.

6. The method of claim 1, wherein the normalisation in accordance with step e) is performed using a multi-point adjustment.

7. The method of claim 6, wherein an external magnetic field influencing the measurements is determined from the difference between the two differently calculated alterations of position, and wherein these alterations of position are corrected by the multi-point adjustment.

8. The method of claim 6, wherein the multi-point adjustment is a 9-point adjustment.

9. The method of claim 6, wherein the multi-point adjustment is a 15-point adjustment.

10. The method of claim 1, wherein an external magnetic field influencing the measurements is determined from the difference between the two differently calculated alterations of position, and wherein these alterations of position can be corrected by comparing them with a measurement under laboratory conditions.

11. The method of claim 1, wherein, when calculating the weighting factor, a predefinable constant $A_{max}$ is taken into account, which describes the degree of deviation between the differentially and non-differentially calculated alteration of position, from which the signal is used exclusively from the differentially calculated alteration of position in accordance with step d) for the calculation of the alteration of position.

12. The method of claim 1, wherein a pre-definable constant $O_{diff}$ is taken into account when calculating the weighting factor to specify a percentage of the differential signal to be used for calculating the alteration of position.

* * * * *